(12) United States Patent
Fiala et al.

(10) Patent No.: US 6,887,530 B2
(45) Date of Patent: May 3, 2005

(54) THERMAL SPRAY COMPOSITIONS FOR ABRADABLE SEALS

(75) Inventors: Petr Fiala, Edmonton (CA); Anthony Peter Chilkowich, Fort Saskatchewan (CA); Karel Hajmrle, Edmonton (CA)

(73) Assignee: Sulzer Metco (Canada) Inc., Fort Saskatchewan (CA)

( * ) Notice: Subject to any disclaimer, the term of this patent is extended or adjusted under 35 U.S.C. 154(b) by 0 days.

(21) Appl. No.: 10/164,009

(22) Filed: Jun. 7, 2002

(65) Prior Publication Data

US 2003/0228483 A1 Dec. 11, 2003

(51) Int. Cl.[7] ............................. B05D 1/08; B05D 1/10; C23C 4/04; C23C 4/06; F16J 15/00
(52) U.S. Cl. ........................ 427/456; 427/446; 427/455; 427/449; 427/450; 427/451; 427/422; 277/415
(58) Field of Search .................. 427/446, 453, 427/455, 456, 449, 450, 451, 452, 422, 427; 277/415

(56) References Cited

U.S. PATENT DOCUMENTS

| | | | |
|---|---|---|---|
| 3,723,165 A | | 3/1973 | Longo et al. .......... 117/93.1 PF |
| 4,257,735 A | | 3/1981 | Bradley et al. .............. 415/174 |
| 5,122,182 A | * | 6/1992 | Dorfman et al. ............... 75/252 |
| 5,302,450 A | | 4/1994 | Rao et al. .................... 428/357 |
| 5,434,210 A | | 7/1995 | Rangaswamy et al. ..... 524/406 |
| 5,506,055 A | | 4/1996 | Dorfman et al. ............. 428/407 |
| 5,536,022 A | | 7/1996 | Sileo et al. ............. 277/235 A |
| 5,631,044 A | * | 5/1997 | Rangaswamy et al. ...... 427/216 |
| 5,702,769 A | | 12/1997 | Peters ......................... 427/451 |
| 5,763,106 A | | 6/1998 | Blanchard et al. ........... 428/570 |
| 5,780,116 A | * | 7/1998 | Sileo et al. .................. 427/456 |
| 5,955,151 A | * | 9/1999 | Hajmrle et al. .............. 427/456 |
| 5,976,695 A | * | 11/1999 | Hajmrle et al. .............. 428/402 |
| 6,004,362 A | * | 12/1999 | Seals et al. .................... 51/295 |
| 6,254,938 B1 | * | 7/2001 | Pranevicius et al. ......... 427/453 |
| 2003/0180565 A1 | * | 9/2003 | Herbst-Dederichs ........ 428/553 |

FOREIGN PATENT DOCUMENTS

| | | |
|---|---|---|
| EP | 0 455 996 A | 11/1991 |
| EP | 0 487 273 | 5/1992 |
| GB | 2 273 109 A | 6/1994 |
| JP | 04 041601 | 2/1992 |
| WO | 02/24970 | 3/2002 |
| WO | 02/068706 | 9/2002 |

* cited by examiner

*Primary Examiner*—Michael La Villa
(74) *Attorney, Agent, or Firm*—Arne I. Fors

(57) ABSTRACT

A thermal spray composition and method of deposition for abradable seals for use in gas turbine engines, turbochargers and steam turbines. The thermal spray composition includes a solid lubricant and a ceramic preferably comprising 5 to 60 wt % total of the composition in a ratio of 1:7 to 20:1 of solid lubricant to ceramic, the balance a matrix-forming metal alloy selected from Ni, Co, Cu, Fe and Al and combinations and alloys thereof. The solid lubricant is at least one of hexagonal boron nitride, graphite, calcium fluoride, lithium fluoride, magnesium fluoride, barium fluoride, tungsten disulfide and molybdenum disulfide particles. The ceramic includes at least one of albite, illite, quartz and alumina-silica.

17 Claims, No Drawings

THERMAL SPRAY COMPOSITIONS FOR ABRADABLE SEALS

BACKGROUND OF THE INVENTION (i) Field of the Invention

This invention relates to abradable seals and, more particularly, relates to high-temperature abradable seal compositions for use in gas turbine engines, turbochargers and steam turbines, and their method of deposition (ii) Description of the Related Art Basic requirements for abradable seals in the compressor section of gas turbine engines include good abradability, spall resistance, and erosion resistance. Abradable seals ate also required to exhibit low gas permeability, a smooth surface, good aging properties and long term oxidation resistance at high temperatures. In the case of abradability, the seal is a sacrificial element, it being desirable to minimize blade wear. Additionally, low gas permeability is required in order to minimize gas flow through the seal itself. It has been shown that low permeable seals with a smooth surface finish improve overall compressor efficiency by about one percent as compared to conventional permeable seals. In addition, low permeability of the seal prevents entrapment of fine particles, e.g. dust or grit, which can act as an abrasive against the blade tips, thus wearing them unevenly. Smooth surface finishes in the gas path improve overall airflow, also contributing to efficiency. Finally, long-term oxidation resistance is required due to increases in compressor operating temperature up to 815° C.

There are several air seals used in a compressor section of a gas or aircraft engine. Historically the oldest is feltmetal that comprises a plurality of metal fibres. The feltmetal is described for example in U.S. Pat. No. 4,257,735. The most important disadvantages of hiss seal ale that it has to be brazed to the substrate material and that it is highly porous.

Typical jet engine compressor air seals include a metal matrix of aluminum and silicon with embedded polymer particles or hexagonal boron nitride powder particles as described in U.S. Pat. Nos. 3,723,165 and 5,506,055, respectively. The disadvantage of these systems is their limited temperature capability at 315° C. for the system with polymer and 480° C. for the system with hexagonal boron nitride. In the former case, the temperature capability is governed by the polymer and in the latter case it is governed by the aluminum silicon alloy.

Abradable materials used at high temperatures in the compressor section of turbine engines are usually NiCrAl/Bentonite coatings. However, NiCrAl/Bentonite seals do not rub well against Ti alloy blades. These coatings perform well against Ni alloy and steel blades but, when Ti alloy blades are used, the blade tips overheat and are subject to wear. Sometimes, glazing of the coating is observed.

Another known abradable seal is that prepared by the techniques of Rangaswamy et al., described in U.S. Pat. No. 5,434,210. A composite powder for thermal spraying of abradable coatings is disclosed in which the composite powder contains three components. One component is any of a number of metal or ceramic matrix materials, another component is a solid lubricant, and the third component is a polymer. Typical as-sprayed coatings comprise a Co alloy matrix with dispersed particles of hexagonal boron nitride and polymer. The polymer is subsequently burned out and the final very porous structure contains only hexagonal boron nitride particles dispersed throughout the Co-based matrix. The coatings prepared from this material have acceptable abradability but low erosion resistance and deposition efficiency. The erosion resistance is required in order to maintain uniform clearances throughout the life of the engine or performance characteristics are adversely affected. Conventional commercial turbine engines have exhibited a two percent increase in airflow around blade tips as a result of seal erosion after approximately 3,000 flights. Much of this may be attributed to erosion of the abradable seal and blade airfoil tip, and to rub interactions between the blade tips and the seal. In military engine applications, where gas path velocities are relatively high, erosion resistance is of paramount importance.

It is accordingly a principal object of the present invention to provide an abradable seal, for use in gas turbine engines at temperatures up to about 815° C., having good abradability, spall resistance and erosion resistance, particularly when used in conjunction with titanium-alloy blades, It is another object of the present invention to provide an abradable seal composition having a smooth surface, low permeability and long-term oxidation resistance resulting in favourable long-term aging characteristics.

A further object of the invention is the provision of a novel thermal spray material and its method of application for producing an abradable seal.

SUMMARY OF THE INVENTION

In its broad aspect, the three-phase thermal spray composition of the invention for an abradable seal comprises a mixture of at least 5 wt % total, preferably 19 to 60 wt % and more preferably 25 to 45 wt %, of a solid lubricant and a ceramic, the balance of a matrix-forming metal alloy. The composition can be in the form of a wire, powder or rod. The solid lubricant is at least one of hexagonal boron nitride, graphite, calcium fluoride, lithium fluoride, magnesium fluoride, barium fluoride, tungsten disulfide and molybdenum disulphide particles, preferably hexagonal boron nitride powder. The ceramic preferably is at least one of albite, illite and quartz particles or mixture thereof, and alumina-silica particles. The ratio of solid lubricant to ceramic is 1:7 to 20:1, preferably 1:6 to 9:1. The matrix-forming metal alloy is selected from Ni, Co, Cu, Fe, Al and combinations and alloys thereof, particularly NiCrAl, NiCr, CuAl and AlSi. Other elements such as Y, Hf, Si, Nb, Re and Ta can be added in small amounts to increase oxidation resistance of the matrix-forming metal alloy. The matrix-forming metal alloy can also contain some other elements as impurities that significantly do not alter alloy properties. The tree-phase thermal spray composition preferably comprises the matrix-forming metal alloy coating at least one of the ceramic particles and hexagonal boron nitride particles. The thermal spray composition can include a particulate fugitive material such as a consumable polymer in an amount of 1 to about 30 wt % of the composition. Another preferred combination of materials is hexagonal boron nitride and alumina-silica-based ceramics in a total amount of 10 to 50 wt %, the balance Ni alloy. Salt, sugar and other fugitive materials would serve the same purpose as the polymer, i.e. to create porosity after their elimination from the abradable coating.

In accordance with another broad aspect of the invention, the abradable seal consists essentially of at least 5 wt % total of the solid lubricant and the ceramic, preferably 19 to 60 wt % and more preferably 25 to 45 wt % total of the solid lubricant and ceramic, in a ratio of 1:7 to 20:1 of solid lubricant to ceramic, the balance a matrix-forming metal alloy selected from the group consisting of Ni, Co, Cu, Fe and Al and combinations and alloys thereof, preferably NiCrAl, NiCr, CuAl or AlSi.

The method of providing an abradable seal on a substrate comprises applying an adherent coating of the said three-phase composition having a thickness of up to 3 mm onto the substrate by thermally spraying a powder, wire or rod composition thereon.

DESCRIPTION OF THE PREFERRED EMBODIMENTS

The abradable seal of the present invention comprises a matrix-forming metal alloy component, a solid lubricant component and a ceramic component, wherein the three components provide a synergism in abradable coatings which have unexpected superior characteristics over prior art materials. The matrix-forming metal alloy is selected from the metals Ni, Co, Cu, Fe and Al and combinations and alloys thereof, preferably NiCrAl, NiCr, CuAl and AlSi. The ceramic component is typified by oxidic ceramics such as ceramics in the group comprising albite, illite and quartz and mixtures thereof and preferably is clad with a metal alloy by a hydrometallurgical process well known in the art prior to blending with particles of a lubricant such as hexagonal boron nitride, graphite, calcium fluoride, lithium fluoride and molybdenum disulphide. Particles, preferably hexagonal boron nitride. A preferred combination of metal alloy or oxidic ceramic is at least one of or a mixture of albite, illite and quartz clad with a NiCrAl coating on the ceramic. A material found to be satisfactory is commercially available as Durabrade™ 2313 from Westaim Ambeon. Another preferred combination of materials is hexagonal boron nitride and alumina-silica-based ceramics in a total amount of 10 to 50 wt %, the balance nickel alloy. The clad ceramic particles can be blended with particles of hexagonal boron nitride available from commercial suppliers.

The ceramic and lubricant components together comprise at least 5 wt % and not more than 60 wt % of the composition, preferably 19 to 60 wt % and more preferably about 25 to 45 wt % of the composition, the balance comprising the matrix metal material. The ratio of solid lubricant to ceramic is 1:7 to 20:1, preferably 1:6 to 9:1.

Although the description proceeds herein with reference to a blend of clad ceramic particles and hexagonal boron nitride, it will be understood that the composition may also be prepared in the form of mechanical blends of the three components, homogenously agglomerated particles, mechanically fused particles, agglomerated ceramic and solid lubricant particles clad with metal alloy or mixtures of metal clad ceramic and metal clad solid lubricant, or as a continuous solid or cored wire.

The three-phase composition of the invention preferably is applied to a substrate by thermal spray to form an abradable seal. Thermal spraying involves the softening or melting of a heat fusible material such as metal or ceramic by heat, and propelling the softened or melted material in particulate form against a surface to be coated. The heated particles strike the surface where they are cooled and bonded thereto. A conventional thermal spray gun may be used for the purpose of the both heating and propelling the particles.

A thermal spray gun normally utilizes a combustion or plasma or electric arc to produce the heat for melting of the composition in either powder or wire form. In a powder type combustion thermal spray gun, the career gas, which entrains and transports the powder, is typically an inert gas such as argon. In a plasma spray gun, the primary plasma gas is generally argon or nitrogen. Hydrogen or helium is usually added to the primary plasma gas, and the carrier gas is generally the same as the primary plasma gas. Other thermal spray methods could also be used. A good general description of thermal spraying is provided in U.S. Pat. No. 5,049,450. The matrix-forming metal alloy powder such as NiCrAl can be dry blended and mixed with the ceramic powder and the lubricant powder, at least one of the ceramic powders and the lubricant powders preferably having a coating of the matrix-forming metal alloy thereon. The matrix metal alloy holds the particles of the ceramic and the solid lubricant in place and adherently bonds the coating to the substrate.

The resulting product is a homogenous abradable seal material comprising the continuous metallic matrix phase which provides structural strength to the composition up to at least an operating temperature of 815° C. The solid lubricant decreases the hardness and strength of the metallic matrix material due to its uniformly dispersed presence as solid soft lubricant particles to enhance ejection of the particles from the coating when abraded. Due to the softness of the lubricant, blade wear is decreased and abradability of the coating is improved. The solid lubricant occupies pore spaces between the metal matrix and ceramic particles to provide a dense structure which will function as a heat sink having enhanced thermal conductivity to conduct heat from the rub zone of the seal. The ceramic component provides enhanced erosion resistance while contributing to the decrease in matrix strength with improved abradability. During the rubbing process by the titanium alloy compressor blades, the seal material abrades readily due to low matrix strength caused by the synergistic effect of the solid lubricant and the ceramic materials. The metal alloy matrix would collapse and compress during the rubbing process without the presence of the ceramic and solid lubricant filler. The coating would become very hard and would glaze with subsequent significantly decreased abradability. Coating glazing thus is limiting by facile particle ejection when rubbed by a compressor blade while acceptable erosion resistance is maintained by the addition of the ceramic material.

The solid lubricant and ceramic particles arc uniformly dispersed throughout the deposited coating. Thus any material removal that occurs does not change coating properties of the remaining seal. Coatings of the invention prepared by thermal spraying the coating composition onto a substrate have an excellent combination of abradability and erosion resistance as a result of the coating properties including low coating cohesive strength, low porosity, low surface roughness and high thermal conductivity. As a result, the coatings can be effectively used in combination with titanium-alloy blades without danger of titanium fire, coating glazing or excessive blade wear. Overall engine efficiency is increased.

If it should be desired to increase porosity of the abradable seal, a particulate polymer having a size range of 1 to 200 μm can be blended with the three-phase composition material in an amount of 1 to 30 wt % of the composition prior to thermal spraying. The fugitive polymer is vaporized, burned out or leached to yield a porous and permeable coating. A list of the polymers which can be used is in U.S. Pat. No. 4,917,960, incorporated herein by reference.

The abradable seal of the invention will now be described with reference to the following non-limitative example.

EXAMPLE

Commercially available Durabrade™ 2313 powder produced by Westaim Ambeon having a particle size in the range of −100+200 mesh was blended with 15 wt % of hexagonal boron nitride lubricant having a particle size of −100+200 mesh sold by Advanced Ceramic Corp. under the name AC 6001. The total of the ceramic and lubricant particles comprised 32 wt % of the powder composition, the balance NiCrAl alloy. The powder blend was flame sprayed (oxygen-acetylene mixture) onto a substrate and the resulting coating properties were compared with the Co-alloy based seal described in U.S. Pat. No. 5,434,210 and sold as SM 2042 by Sulzer Metco:

|  | Applicants' Seal | Co-based Seal (U.S. Pat. No. 5,434,210) |
| --- | --- | --- |
| Density [g/cm$^3$] | 3.4 | 2.68 |
| Hardness (HR15Y) | 19 | 40 |
| Ambeon Erosion 90° [g/min] | 0.5 | 2.05 |
| Ambeon Erosion 90° [mm$^3$/min] | 147 | 765 |
| Coating Strength [psi] | 299 | 788 |
| Deposition Efficiency [%] | 47 | N/A |
| Thickness [mm] | 2 | 2 |
| Abradability (blade wear [inch]) |  |  |
| 1000-0.0002-0.03* | 0.001 | 0.003 |
| 820-0.02-0.03 | 0.008 | 0.026 |

Abradability was measured using a Ti alloy test blade that rubbed against tested seals. Test conditions were: 1000 and 820 ft/s blade tip speed, 0.0002 and 0.02 in/s incursion rate and 0.03 inch total incursion. All rub paths of the seal of this invention were smooth with no glazing or discoloration.

The particles of the ceramic and the boron nitride were uniformly dispersed throughout the coating. The good properties of the applicants' seal are demonstrated by substantially-improved erosion resistance and abradability performance compared to the Co-based seal.

It will be understood, of course, that modifications can be made in the embodiments of the invention illustrated and described herein without departing from the scope and purview of the invention as defined by the appended claims.

What is claimed is:

1. A method of providing a three-phase abradable seal on a substrate comprising applying an adherent coating having a thickness of up to 3 mm to the substrate by thermally spraying a composition thereon comprising 5 to 60 wt % total of a solid lubricant and at least one ceramic selected from the group consisting of albite, illite, mixtures thereof and alumina-silica-based ceramics in a ratio of 1:7 to 20:1 by weight of solid lubricant to ceramic, the balance a matrix-forming metal alloy, wherein the solid lubricant is hexagonal boron nitride and wherein the matrix-forming metal alloy is selected from the group consisting of alloys of Ni, Co, Fe and combinations thereof.

2. A method of providing an abradable seal as claimed in claim 1 in which the thermal spray composition is a wire, a powder or a rod.

3. A method of providing an abradable seal as claimed in claim 2, in which the be matrix-forming metal alloy is Ni alloy.

4. A method of providing an abradable seal as claimed in claim 2, in which the ceramic includes at least one of albite and illite particles or mixture thereof.

5. A method of providing an abradable seal as claimed in claim 2, in which the ceramic is an alumina-silica-based ceramic.

6. A method of providing an abradable seal as claimed in claim 2, in which the matrix-forming metal alloy is NiCrAl.

7. A method of providing an abradable seal as claimed in claim 6, in which the ceramic includes at least one of the albite and illite particles or mixtures thereof.

8. A method of providing an abradable seal as claimed in claim 4, in which the total of solid lubricant and ceramic in the composition prior to thermal spraying is about 25 to about 45 wt % of the composition.

9. A method of providing an abradable seal as claimed in claim 5, in which the total of solid lubricant and ceramic in the composition prior to thermal spraying is about 10 to about 45 wt % of the composition.

10. A method of providing an abradable seal as claimed in claim 6, in which the total of solid lubricant and ceramic in the composition prior to thermal spraying is about 25 to about 45 wt % of the composition.

11. A method of providing an abradable seal as claimed in claim 8, in which the solid lubricant and ceramic in the composition prior to thermal spraying are present in a ratio of 1:6 to 9:1 by weight of solid lubricant to ceramic.

12. A method of providing an abradable seal as claimed in claim 9, in which the solid lubricant and ceramic in the composition prior to thermal spraying are present in a ratio of 1:6 to 9:1 by weight of solid lubricant to ceramic.

13. A method of providing an abradable seal as claimed in claim 10, in which the solid lubricant and ceramic in the composition prior to thermal spraying are present in a ratio of 1:6 to 9:1 by weight of solid lubricant to ceramic.

14. A method of providing an abradable as claimed in claim 4, in which the matrix-forming metal alloy is Ni alloy, said Ni alloy cladding at least one of the ceramic particles and the hexagonal boron nitride particles prior to thermal spraying.

15. A method of providing an abradable seal as claimed in claim 1, additionally comprising in the composition prior to thermal spraying a particulate consumable polymer comprising 1 to about 30 wt % of the composition.

16. A method of providing an abradable seal as claimed in claim 5, additionally comprising in the composition prior to thermal spraying a particulate consumable polymer comprising 1 to about 30 wt % of the composition.

17. A method of providing an abradable seal as claimed in claim 4, additionally comprising in the composition prior to thermal spraying a particulate consumable polymer comprising 1 to about 30 wt % of the composition.

* * * * *